US005185697A

United States Patent [19]

Jacobs et al.

[11] Patent Number: 5,185,697

[45] Date of Patent: Feb. 9, 1993

[54] APPARATUS AND METHOD FOR MANAGING CRISIS SITUATIONS

[75] Inventors: Kendall E. Jacobs, Springfield; Mary B. Weipert, Falls Church, both of Va.

[73] Assignee: Electronic Warfare Associates, Inc., Vienna, Va.

[21] Appl. No.: 435,969

[22] Filed: Nov. 14, 1989

[51] Int. Cl.$^5$ ........................ G06F 15/38; G06G 7/60

[52] U.S. Cl. ........................................ 364/419; 379/45

[58] Field of Search ............................ 364/419, 413.01; 379/37, 45; 455/4.1

[56] References Cited

U.S. PATENT DOCUMENTS

| | | | |
|---|---|---|---|
| 4,491,725 | 1/1985 | Pritchard | 364/408 |
| 4,860,352 | 8/1989 | Laurance et al. | 364/408 |
| 4,939,352 | 7/1990 | Sunyich | 235/382 |

OTHER PUBLICATIONS

Principi et al., "Better Care, Shorter Stays, Thanks to Networking", *Data Communications,* Nov. 1986.

Brimm, "Computers in Critical Care", *Critical Care Nursing Quarterly,* 1987, pp. 53–63.

*Primary Examiner*—Roy N. Envall, Jr.
*Assistant Examiner*—Laura Brutman
*Attorney, Agent, or Firm*—Cushman, Darby & Cushman

[57] ABSTRACT

A crisis management system having a crisis command center and multiple remote units. Information gathered by the remote units, or received at crisis command center, is input to a central computer designed to organize the information in various topic files. The information is tagged automatically with a time of entry and then organized chronologically in a selected file. The information is then utilized to update automatically any files related to the selected file. Next, the information is transmitted from the crisis command center to the remote units and input to the appropriate file in each remote computer. The transmitted information is used to update all related files located at the remote unit, thereby enabling all remote units to maintain up-to-date information pertaining to the crisis.

18 Claims, 5 Drawing Sheets

APPARATUS AND METHOD FOR MANAGING CRISIS SITUATIONS

BACKGROUND OF THE INVENTION

1. Field of the Invention

The present invention relates to a system for crisis management. More particularly, the present invention relates to a crisis management system for receiving information from various sources, chronologically organizing the information in files, updating automatically all related files, and providing the information in a comprehensible format to assist authorities during a crisis.

2. Description of Prior Art

Crisis management is the methodology of efficiently organizing information relating to an emergency or crisis situation. Crisis management maximizes the usefulness and availability of crucial information, while attempting to minimize wasteful or redundant information.

Several aspects are critical to an effective crisis management system. First, the information must be received and organized in an efficient manner. If the information is not filed appropriately upon receipt, this information may lose all utility because it can not be located during a critical time. Second, the information must be easily accessible to permit crisis teams (i.e., groups established to combat the crisis situation) to recall instantly any previously received information. This aspect is very important because most crisis situations have absolute deadlines or severe time constraints which must be met. An inability to access and recall critical information may well render useless any effort to solve the crisis situation. Finally, the information must be presented in an easily comprehensible format. For effective crisis management, the crisis team must be able to comprehend quickly all the information thus far obtained. Raw information which has not been organized and presented in an readily understandable format will inhibit crisis decision making because the team may not have time to mentally organize all the facts and circumstances arising during the crisis situation.

Crisis management is an increasing concern among many organizations which combat illegal and terrorist activities. For example, the FAA is concerned with hijackings, the CIA and military are faced often with hostage situations, and the FBI encounters kidnapping and extortion scenarios. In these activities, crisis management helps the crisis action teams to organize information pertaining to the descriptions of the suspects, the demands of the suspects, and investigative leads. Moreover, crisis management attempts to document chronologically each piece of usable information because the sequence of events is generally the most crucial factor in these crisis situations. Based on the organized information, the crisis teams develop informed strategies on how best to combat the specific crisis.

Crisis management is useful also during non-illegal emergencies, such as natural disasters. Groups in geographical locations prone for natural disasters (such as residents of California for earthquakes, those citizens of the southeastern U.S. for hurricanes, and citizens of the midwest U.S. for tornadoes) might employ crisis management techniques to organize information relating to the coordination of rescue efforts, the coordination of distributing supplies to the desired locations, and the management of incoming support items of food, clothing, and money. An appropriate crisis management system may help thwart the many hardships resulting from a natural disaster.

Present crisis management centers employ crude methods of organizing critical information. Often times, only a paper and pencil are used. For example, at a typical crisis command center (i.e., a location which has been established to serve as the intelligence headquarters during a particular crisis), butcher paper may be attached to the walls and tables. Then, as information is received, crisis team members write the information on the applicable wall section or table corresponding to the type of information received. Accordingly, as the crisis situation progresses, the crisis command center becomes a room full of disorganized lists of information.

As is readily apparent, this method of crisis management is extremely cumbersome and disorganized. Each crisis team member must constantly be aware of all lists of information scattered throughout the room, and then mentally organize this information into a logical sequence of events. As a result, crisis team efforts are inherently slowed simply due to the crisis management system employed. The information is not efficiently organized, mental steps are needlessly repeated by each team member, and the retrieval of certain key information may be severely delayed or lost.

To combat these problems, some groups have attempted to computerize the above described crisis management system. When information is received, a crisis team member enters this information into an the appropriate file in the computer. Then, when information is desired, a crisis team member accesses the appropriate file. As a result, information is no longer scattered throughout the room, and access time to information is reduced slightly.

However, many of the problems inherent in the paper and pencil management system are still prevalent in this computerized version because the systems are basically identical. The keyboard and screens of the computer system merely replace the pencil and paper. Yet, to retrieve key information, one still has to find the computer file in which the information was input. Then, if additional related information is required, one must access other files in which the related information was input. Thus, if a crisis team member forgets which file contains the information, or which files contain related information, valuable and crucial information will not be readily available to the crisis action team.

The conventional systems are also severely limited in the recordation of information. For example, when new information is received a crisis team member must sit down and manually enter the information into the computer. Moreover, the team member must input this information into each related file or else risk the information being overlooked during a critical time. Accordingly, this computerized system fails to enhance the decision making during critical times because it does not organize and make available automatically key information in the appropriate file, and all related files thereto.

SUMMARY OF THE INVENTION

An object of the present invention is to provide a crisis management system which effectively organizes crisis information.

Another object of the present invention is to provide a crisis management system which allows quick access to key information and presents this information in an easily comprehensible form.

Still another object of the present invention is to provide a crisis management system which automatically organizes information in a chronological manner and automatically updates all files relevant to the information.

It is another object of the present invention to provide a crisis management system which automatically and chronologically organizes received information according to applicable time zones.

Yet another object of the present invention is to provide a crisis management system having multiple remote units which transmit newly acquired information to a crisis command center, and receive updated information therefrom.

To achieve these and other objects, a crisis management system according to the present invention receives from various sources information concerning a crisis situation. Once received, a computer stores the information in a file selected based upon the nature of the information. The computer has multiple computer files, and each file is tailored to a topic characterizing a certain type of information. The computer then updates automatically other relevant computer files with the information.

According to the present invention, the computer also automatically attaches a time to the information as it is stored in the computer. The computer then organizes the information chronologically with respect to the attached time in the selected computer file. Accordingly, crisis information is organized in several topic files based upon the nature of the information, and further organized chronologically within each topic file.

The crisis management system of the present invention may also include communication equipment, compatible with the computer, for receiving information from remote locations and transmitting information thereto. According to one embodiment of the present invention, the crisis management system has a crisis command center and several remote units. Information gathered by the remote units is received at crisis command center and analyzed by crisis team members. If the information is relevant to the crisis situation, it is input to a central computer located at crisis command center. The computer stores the information in one of many topic files which is selected based upon the nature of the information. Upon input, the computer automatically tags the information with a time of entry and then organizes it chronologically in a selected file. The time tag is based on the current time of the time zone in which the crisis arose. The central computer then updates automatically any files related to the selected file.

Next, the crisis command center transmits the information to the remote units. Each remote unit may be equipped with a communication device and a remote computer. Once the remote unit receives the information, the remote computer stores the information in a selected remote file based upon the nature of the information. The remote computer then updates automatically any remote files related to the selected remote file. When the remote unit gathers new information, this information is also input and stored in the remote computer. The remote unit then transmits the new information back to the crisis command center for analysis by the crisis team member.

Accordingly, any new information gathered by one remote crisis team member is quickly sent to the crisis command center for analysis and then disseminated to all other remote units. Thus, each crisis team member possesses the same updated information.

The crisis management system according to the present invention improves organization by automatically time tagging the information and arranging it chronologically in predetermined topic files. The present invention also eliminates redundant recordation by updating automatically all files related to the selected file.

Further, by providing an efficient and effective method of disseminating information amongst the crisis command center and all remote units, problems such as redundant searches, misinformed crisis team members, and over allocation of resources to one investigative issue are effectively reduced.

BRIEF DESCRIPTION OF THE DRAWING

These and other advantages will become more apparent from the detailed description of the preferred embodiment along with the following drawings.

DESCRIPTION OF THE PREFERRED EMBODIMENT

Figure 1:
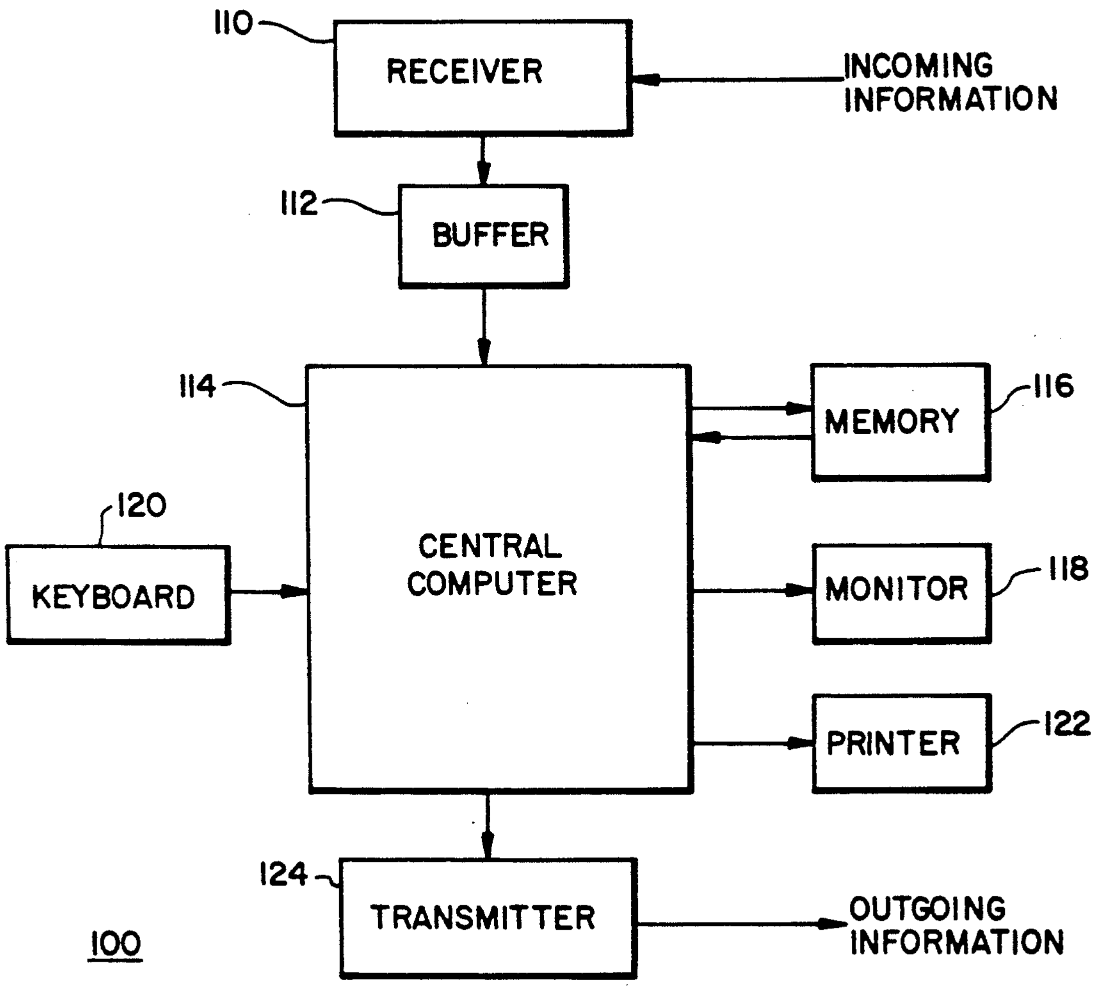
FIG. 1 is a block diagram of a first embodiment of a crisis management system according to the present invention.

FIG. 1 shows a block diagram of crisis command center 100 according to the present invention. Incoming information is received by receiver 110 which may be any instrument employed to receive information, such as a radio receiver, a telephone and modem, a facsimile machine, and so forth. Buffer 112 receives the information from receiver 110 and temporarily holds it until analyzed by a crisis team member. Buffer 112 may be a temporary storage device which holds computer code transmitted over phone lines or may be a physical facsimile copy of information waiting to be reviewed by a crisis team member before being input to the crisis system. If the information in buffer 112 is deemed by a crisis team member not to be relevant to the particular crisis, the information is discarded.

On the other hand, if the information is deemed relevant, central computer 114 stores the information in a selected topic file, automatically tags the information with a time of entry, organizes the information chronologically in the selected topic file, and automatically updates all relevant topic files associated with the selected topic file. Memory 116, coupled to central computer 114, stores the topic files when not being processed by central computer 114.

Monitor 118 displays the information in a predetermined format according to the accessed topic file. This predetermined format is familiar to crisis team members and permits them to comprehend quickly the desired information. Keyboard 120 enables a crisis team member to input to central computer 114 new information received at crisis command center 100.

Printer 122 provides hard copies of the topic files. These hard copies are particularly useful in the preparation of reports and briefings. Furthermore, these copies provide a permanent record of crisis actions.

After the information is processed by central computer 114, transmitter 124 transmits outgoing information to remote locations. Transmitter 124 could be any instrument for transmitting information including, but not limited to, telephones, radios, and transmitters adaptable to satellite communications.

Figure 2:
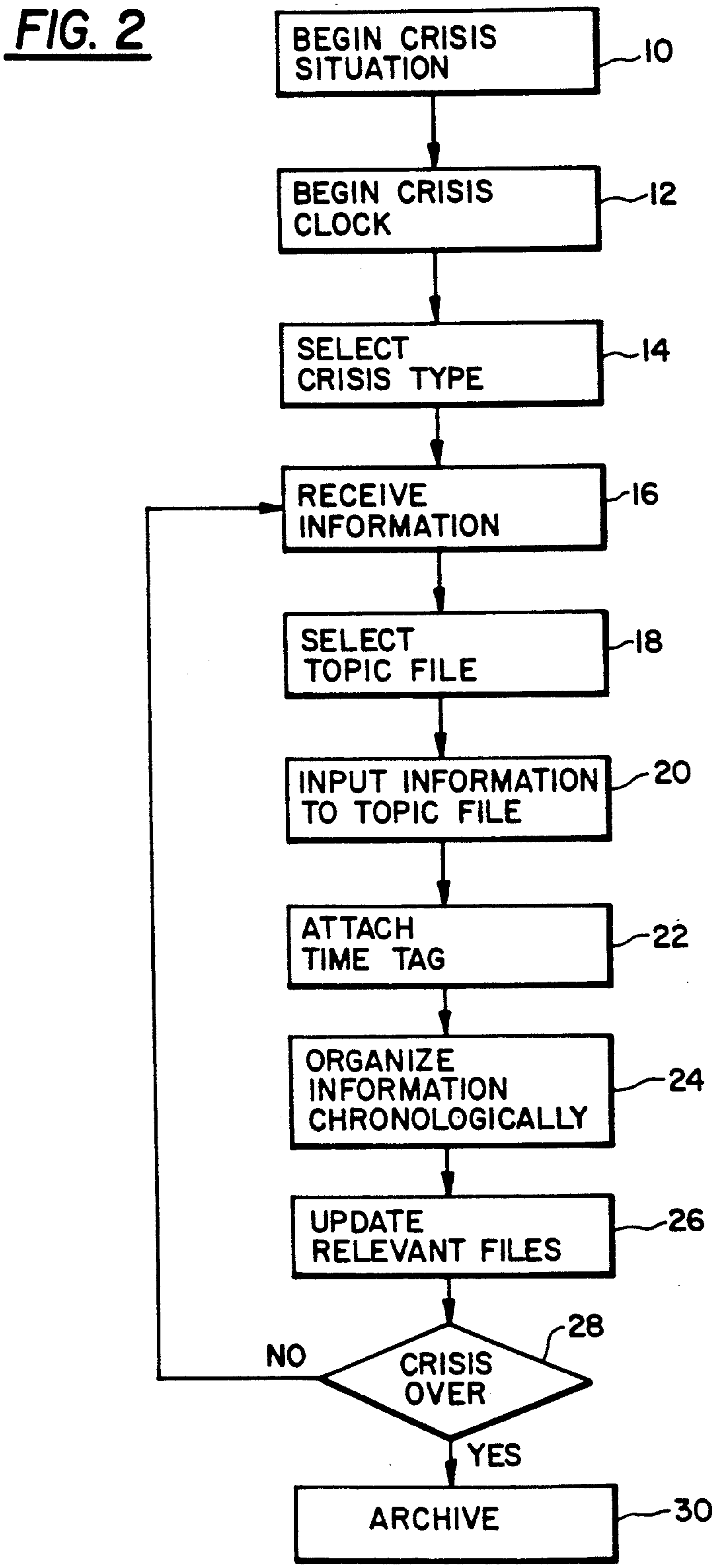
FIG. 2 shows a flow chart executed by the first embodiment shown in FIG. 1.

FIG. 2 shows a preferred embodiment of flow chart executed by central computer 114. The crisis management system begins operation at step 10 when a crisis is identified. Thus, when a hijacking or kidnapping crisis situation is confirmed, or when an earthquake crisis situation is realized, crisis management commences. Next, software within central computer 114 causes a crisis clock within central computer 114 to be initiated at step 12. The crisis clock references all strategic activities to a time according to the time zone in which the crisis situation has arisen. The time zones are predefined enabling a crisis team member to quickly identify the applicable time zone.

Having identified the crisis situation at step 10, the crisis team member selects the crisis situation at step 14 and enters it into central computer 114. Certain crisis situations, such as hijackings, hostage barricades, bomb threats, extortions, kidnappings, earthquakes, hurricanes and floods are preset situations stored internally in central computer 114, while other crisis situations may be defined. Each crisis situation possesses a predetermined number of topic files which organize the crisis information based upon the nature of the information in relation to the selected crisis. These topic files include topics such as suspects, victims, demands, evidence, vehicles involved, leads, and so forth for a crisis arising from illegal and terrorist activity, and topics such as current supplies, incoming aid, injuries, shortages, and so forth for a crisis arising from a natural disaster. Some topic files are employed for all crisis situations, whereas other topic files are specific to the crisis situation. Entering the crisis situation into central computer 114 at step 14 enables central computer 114 to activate those topic files which are required to organize the information for the selected crisis situation. When the topic files are not being processed, they are stored in memory 116.

At step 16, the crisis management system receives information. This information can be received from any source, including crisis team members, agency databases (for example, from the FBI, CIA, FCC, or Red Cross), phone tips and media tips. At step 18, a topic file which best characterizes the received information is selected and central computer 114 accesses this selected topic file.

The information is then input to the selected topic file at step 20. For example, a crisis team member may enter the information to central computer 114 via keyboard 120. Monitor 118 exhibits the topic files in a predetermined format familiar to the crisis team members, thereby enhancing entry of crisis information.

Upon input, central computer 114 tags automatically the information with a time of entry at step 22. Central computer 114 assigns a time according to the time zone chosen above at step 12 and a corresponding Zulu time (i.e., Greenwich mean time). Zulu time is important because many agencies synchronize operations with this time.

At step 24, central computer 114 organizes the information chronologically in the selected topic file according to the time tag. This organization enhances easy access when a crisis team member desires to retrieve critical information.

At step 26, central computer 114 updates automatically other topic files related to the selected topic file with the information. Accordingly, information recorded in one topic file is added automatically to other topic files, thereby eliminating the necessity of recording each new piece of information in numerous related topic files. This feature also insures that all related topic files maintain current information, thus eliminating problems experienced by conventional systems which result from neglect to record the information in all related files.

At step 28, it is determined whether the crisis selected at step 14 is finished. If the crisis situation is not finished, the crisis management system continues to receive information (step 16). On the other hand, when the crisis is finished, the information may be archived at step 30. To archive the information, a crisis team member copies from central computer 114 all topic files for the crisis situation onto a permanent storage medium, such as a floppy disk, a compact disk, or the like. These stored files may then later be retrieved if necessary.

Figure 3:
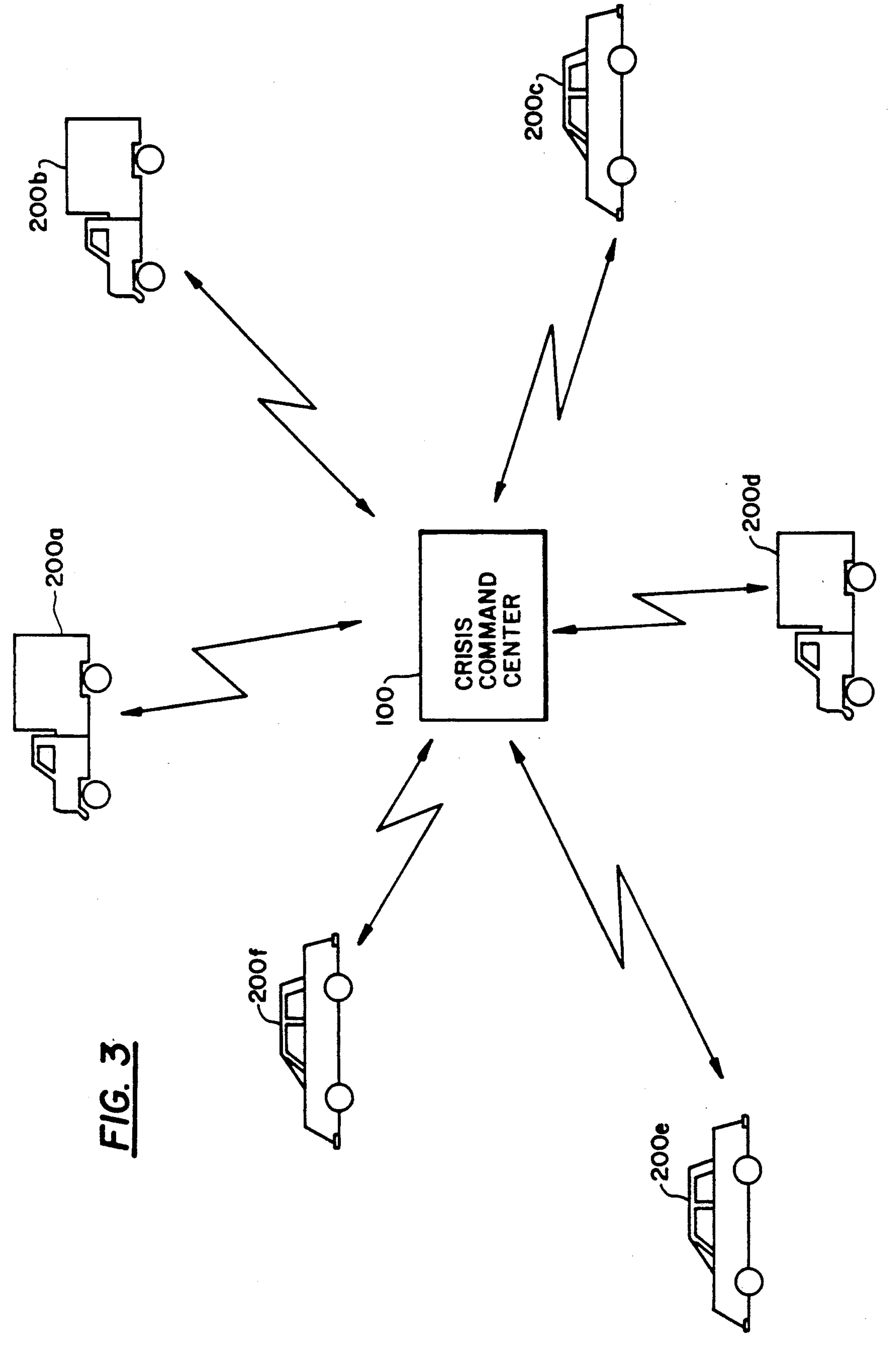
FIG. 3 shows a second embodiment of the present invention.

FIG. 3 shows a second embodiment of a crisis management system having crisis command center 100 and multiple remote units 200*a*–200*f*. Crisis command center 100, as described with reference to FIGS. 1–2, is established as command headquarters for a particular crisis. Generally, the top decision makers are located at crisis command center 100 and thus, all crucial information is directed toward this location.

Remote units 200*a*–200*f* represent any source from which information may be obtained. For example, remote units 200*a*–200*f* may represent specially deployed investigative units having remote facilities capable of communicating with crisis command center 100 and central computer 114. Thus, remote unit 200*a* may represent a crisis team member investigating crisis related issues in New Jersey, and remote unit 200*c* may represent a crisis team member investigating leads in Chicago. On the other hand, remote units 200*a*–200*f*, although illustrated as vehicles, may also represent other information sources, such as databases, phone tips, radio transmissions, police reports, media tips, and so forth.

Any pertinent information discovered by remote units 200*a*–200*f* is directed to crisis command center 100. Upon receipt, a crisis team member at crisis command center 100 will analyze the information. If the information is deemed relevant to the crisis, it is input to central computer 114 which stores the information in a selected topic file and updates automatically all related topic files. Next, crisis command center 100 transmits the information to those remote units 200*a*–200*f* capable of receiving communication from crisis command center 100. Thus, through the interaction of crisis command center 100 and remote units 200*a*–200*f*, each remote crisis team member has real-time access to the same information as crisis team members at crisis command center 100.

Accordingly, the crisis management system of the present invention enables all crisis team members to have access to the most recent information. For example, if remote unit 200*a* discovered a fact regarding the crisis, this information would quickly be sent to crisis command center 100 for analysis and then disseminated to all remaining remote units 200*b*–200*f* (i.e., those remote units capable of receiving information from crisis command center 100).

Moreover, the present invention minimizes redundant information. By disseminating to all remote units the information discovered by one remote unit, the amount of investigative overlap is reduced considerably. Thus, if remote unit 200*c* has already investigated a certain issue, remote unit 200*d* will not need to investigate this same issue.

Figure 4:
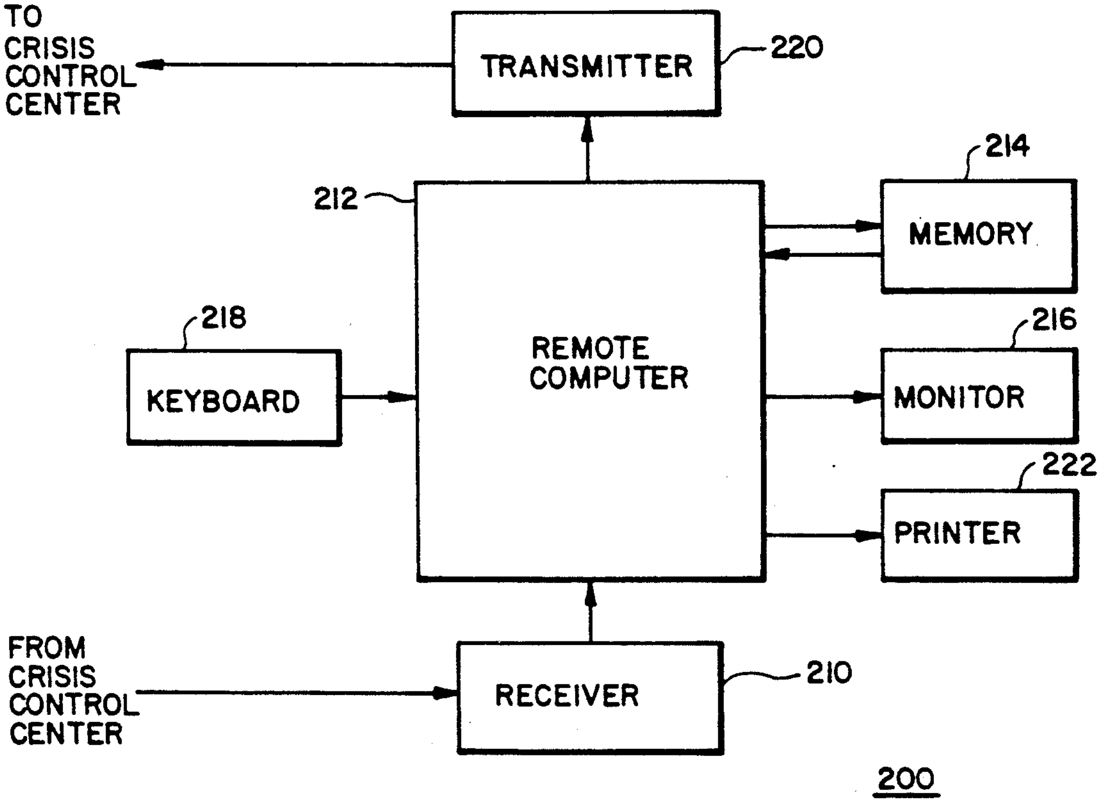
FIG. 4 is a block diagram of a remote unit according to the second embodiment.

As mentioned above, remote units 200*a*–200*f* may have facilities capable of communicating with crisis command center 100. FIG. 4 shows a block diagram of a remote unit 200 according to the present invention. Receiver 210, which may be a cellular telephone, a radio, a remote facsimile machine, and so forth, receives information from crisis command center 100. Remote computer 212 (for example, a lap top computer) organizes and stores the information in a selected topic file, and then updates automatically all topic files associated with the selected topic file. Memory 214 stores the topic files for remote computer 212.

Monitor 216 displays the information in the predetermined format according to the accessed topic file, thereby permitting a remote crisis team member to view the same information as seen by teams members at crisis command center 100. Keyboard 218 enables a remote crisis team member to input newly gathered information into remote computer 212.

Transmitter 220 transmits the new information to crisis command center 100 where it is determined whether the information is relevant to the particular crisis. Transmitter 220 could be any instrument for transmitting information back to crisis command center 100 including, but not limited to, a cellular telephone, a facsimile machine, a car radio, a separate radio, a commercial phone, and a transmitter adaptable to satellite communication. Printer 222 provides a hardcopy of the topic files for the remote crisis team member.

For crisis situations having security interests, crisis command center 100 and remote units 200 are equipped with security devices and protocol to ensure safe transmission of information between crisis command center 100 and remote units 200. For example, various transmission schemes may be used to encode information, thereby making it difficult to intercept and decipher.

Figure 5:
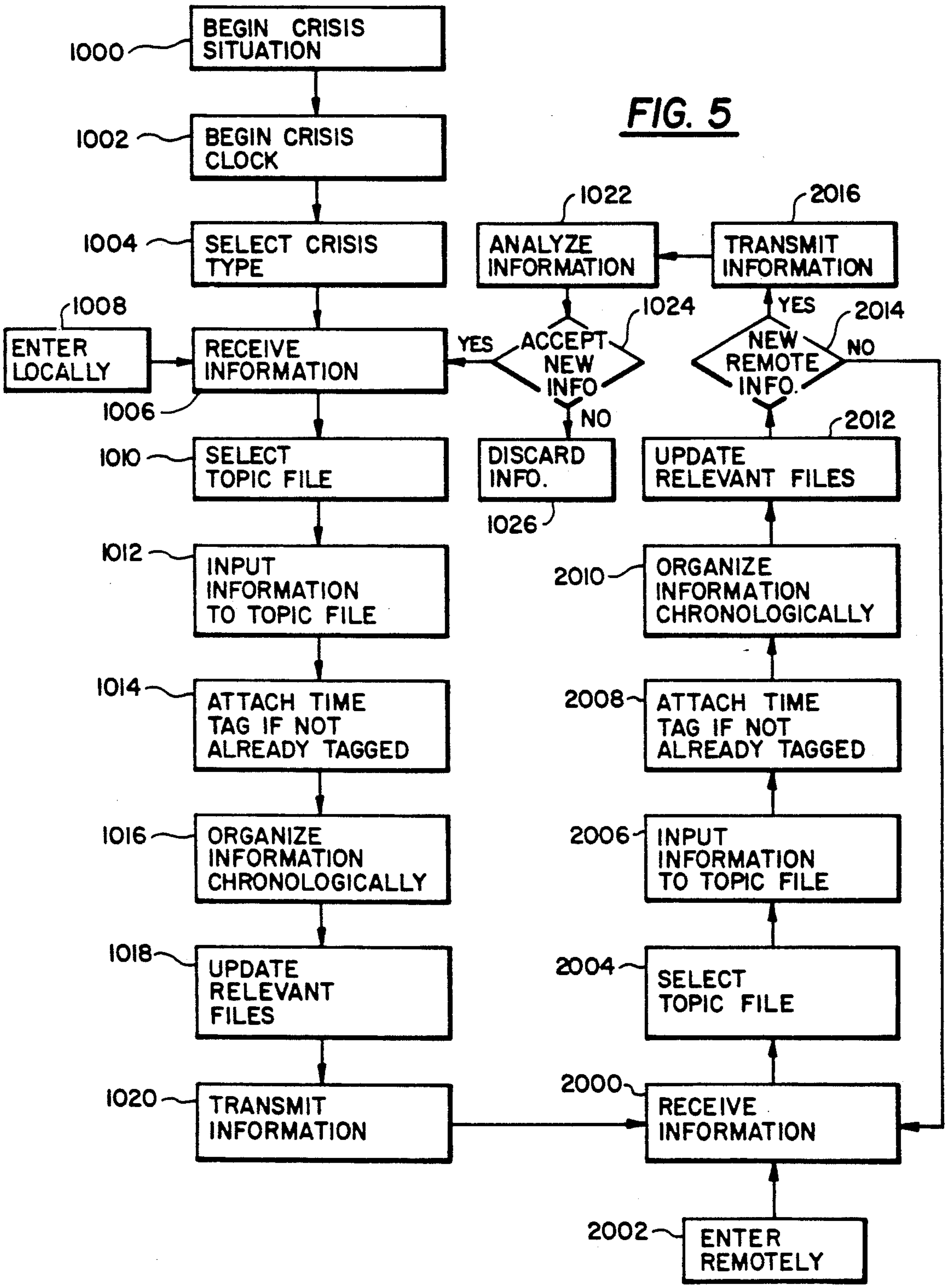
FIG. 5 is a flow chart executed by the second embodiment of the present invention.

The operation of the crisis management system according to the second embodiment of the present invention will now be described with reference to the flow chart in FIG. 5. For simplification and exemplary purposes, the flow diagram in FIG. 5 illustrates a crisis management system having only one remote unit. However, it should be understood that the principles taught below may easily be extended to a crisis management system having multiple remote units as shown in FIG. 3.

The operation at crisis command center 100 is identical to that discussed above in reference to the first embodiment shown in FIG. 1. The crisis management system begins operation at step 1000 when a crisis is identified. Next, software within central computer 114 causes the crisis clock within central computer 114 to be initiated at step 1002. The crisis clock is set to the time zone in which the crisis situation has arisen. At step 1004, the crisis team member enters the relevant type of crisis situation into central computer 114 which causes central computer 114 to activate the topic files required to organize the crisis information.

At step 1006, central computer 114 is ready to receive information which may be entered via keyboard 120 at step 1008 by a local crisis team member or received via receiver 110 from remote unit 200. At step 1010, a topic file which best characterizes the received information is selected. This selection may be made manually if the information is being entered into central computer 114 for the first time by a crisis team member, or performed automatically by central computer 114 if the information is received from a compatible source which transmits the information in a format recognized by central computer 114.

Central computer 114 then inputs the information to the selected topic file at step 1012. As with selection step 1010, this step may be initiated manually by actually entering information to central computer 114 via keyboard 120 or performed automatically by central computer 114 when the information is received from a compatible source (for example, when receiver 110 is a telephone with modem and transmitter 220 is a telephone with modem, the relevant information received from remote computer 212 could be electronically input to central computer 114 via the phone link without any interaction with a central crisis team member). In addition to simply adding information to selected topic files, a central crisis team member may also access a topic file in central computer 114 and alter the information already stored therein.

Upon input, central computer 114 automatically tags the information with a time of entry and a corresponding Zulu time at step 1014. If the information already has a time tag (for example, if time tagged at remote unit 200), central computer 114 may not retag the information at step 1014. However, central computer 114 may alter the existing time tag, or attach a new time tag, at crisis command center 100 if so desired by central crisis team members.

At step 1016, central computer 114 organizes the information chronologically with respect to the time tag in the selected topic file and then updates automatically other topic files related to the selected topic file at step 1018.

At step 1020, central computer 114 transmits the information via transmitter 124 from crisis command center 100 to remote units 200.

At step 2000, remote computer 212 at remote unit 200 is ready to receive information which may be entered via keyboard 218 by a remote crisis team member at step 2002 or received via receiver 210 from crisis command center 100. An appropriate remote topic file is selected at step 2004 and the remote computer 212 inputs the information the selected topic file at step 2006. Central computer 114 may perform automatically steps 2004 and 2006 when the information is received from crisis command center 100 because the information is transmitted in a format recognizable by remote computer 212 (for example, via a phone link). On the other hand, steps 2004 and 2006 may be initiated manually if the remote crisis team member is entering the information for the first time via keyboard 218. In addition, the remote crisis team member may select a file and alter the information previously input to the selected topic file.

At step 2008, remote computer 212 tags automatically information entered for the first time by a remote crisis team member with a time of entry. However, remote computer 212 will not time tag information received from crisis command center 100 because it has already received a time tag at crisis command center 100 during step 1014.

Remote computer 212 organizes the information chronologically in the selected remote topic file at step 2010 and then updates automatically all files relevant to the selected remote topic file at step 2012. Accordingly, remote computer 212 causes the information received from crisis command center 100 to be input to the proper remote topic file (steps 2004 and 2006), organized chronologically in the remote topic file (step 2010) and utilized to update all related remote topic files (step 2012) without any interaction from a remote crisis team member at remote unit 200. Thus, the remote crisis team member has access to all current information, but does not waste critical investigative time recording and organizing this information.

At step 2014, remote computer 212 determines if there exists any newly entered information which needs to be sent to crisis command center 100. If no new information is entered by the remote crisis team member, the remote computer 212 returns to the receive mode at step 2000 to await further information. However, if the remote crisis team member has entered new information, remote computer 212 transmits this new information via transmitter 220 back to crisis command center 100 at step 2016.

At step 1022, the information transmitted from remote unit 200 is received at crisis command center 100 by receiver 110 and input to buffer 112 to be analyzed by a central crisis team member. According to decision step 1024, if the central crisis team member deems the information relevant to the particular crisis, the information is input to central computer 114 (step 1006). On the other hand, if the information is deemed irrelevant to the crisis, it is discarded at step 1026.

The crisis management system according to the present invention also has backup, retrieval and archiving functions to preserve permanently the information. Topic files may be backed up on a floppy disk and stored. The retrieval function permits a crisis team member to retrieve the information from the floppy disk. The archiving function is similar to the backup function in that archiving allows the crisis team member to copy the files onto a floppy disk. However, unlike the backup function, the archiving function then erases all information in the topic files from central computer 114 and memory 116. Accordingly, archiving is employed only at the conclusion of a crisis.

The crisis management system according to the present invention will now be described in reference to a specific exemplary crisis, such as a kidnapping occurring at 12:00 a.m., in Washington, D.C. Upon first notice of the kidnapping, a crisis team member at crisis command center 100 begins the crisis management system by inputting the applicable crisis time zone (i.e., Eastern Standard Time) into central computer 114. The crisis data input hereinafter will now be tagged and organized automatically according to EST and Zulu time.

After the crisis clock is set, a crisis team member selects kidnapping from a menu of crisis situations (see TABLE 1) provided by central computer 114 which activates the topic files required to organize the influx of information pertaining to the kidnapping.

TABLE 1

| CRISIS SITUATIONS |
|---|
| 1. Aircraft Hijacking |
| 2. Hostage barricade |
| 3. Bomb Threat |
| 4. Extortion |
| 5. Kidnapping |
| 6. Earthquake |
| 7. Hurricane |
| 8. Tornado |
| 9. Flood |

In this example, central computer 114 provides 18 topic files as shown in TABLE 2 for the kidnapping crisis situation.

TABLE 2

| TOPIC FILES FOR KIDNAPPING | |
|---|---|
| 1. Status of Crisis | 10. Evidence |
| 2. Initial Checklist | 11. Exec. Summary |
| 3 Leads | 12. Print |
| 4. Suspect | 13. View Log |
| 5. Vehicles Involved | 14. Victims Corp. |
| 6. Incident Summary | 15. Telephone Log |
| 7. Command Post Readiness | 16. Drop Site |
| 8. Demands | 17. Surveillance |
| 9. Injuries | 18. Victims |

As kidnapping information is received, a crisis team member selects from a menu provided by central computer 114 one of these topic files which best characterizes the information. Central computer 114 then causes the information to be input to the selected topic file. Thus, when a crisis team member at the crisis command center 100 receives information at 1:00 a.m. pertaining to the kidnapped victim, this information is input to central computer 114 via keyboard 120 into the VICTIMS topic file and central computer 114 automatically tags the information with the time 1:00 a.m. Since the VICTIMS topic file is exhibited on monitor 118 in a predetermined and familiar format, the crisis team member efficiently inputs the information into prespecified information locations such as the victim's name, address, age, medical record and closest relatives. Further, a crisis team member may easily extract specific victim information by quickly examining the VICTIMS topic file exhibited on monitor 118 and reading the information from the appropriate information location.

At 2:00 a.m., another crisis team member receives information from a phone tip that the kidnappers are driving a 1978 blue van. This van description is input to central computer 114 into the VEHICLES INVOLVED topic file and central computer 114 automatically tags the information with the time 2:00 a.m. When later discovered at 3:00 a.m. that the kidnappers are believed to have traded automobiles from the blue van to a 1984 Buick, this information is also input to central computer 114 into the VEHICLES INVOLVED topic file and central computer 114 automatically tags the information with the time 3:00 a.m. Central computer 114 organizes these two information entries in the VEHICLES INVOLVED topic file chronologically according to the time tags.

After the information is input to the topic files and time tagged, central computer 114 automatically updates all topic files related to the selected topic file. Thus, a topic file such as VIEW LOG (a topic file which provides a brief up-to-date summary of events to key decision makers at crisis command center 100) is updated automatically by central computer 114 upon each entry of information. For example, based upon the above mentioned entries, central computer 114 automatically updates the VIEW LOG topic file to include the following information:

| Entry | Time | Topic |
|---|---|---|
| 1. Kidnapping | 12:00 am | Crisis |
| 2. Victim's name | 1:00 am | Victim |
| 3. Blue van | 2:00 am | Vehicle |
| 4. Buick | 3:00 am | Vehicle |

In addition to the VIEW LOG topic file, central computer 114 also updates a portion of the SUSPECTS topic file reserved for suspects' car information with the vehicle information. Accordingly, central computer 114 may update one or more topic files with each single entry of information. Furthermore, since central computer 114 is able to time tag each entry and update related pertinent files, the information is efficiently and effectively managed.

Now, suppose at 4:00 a.m., a crisis team member in remote unit 200*a* discovers that one of the kidnappers is male, approximately 25 years old, medium height and weight and wearing a red jacket. Further, at 5:00 a.m., another member in remote unit 200*b* locates a witness that may have seen a blue van matching the description, but was too inebriated to know for certain. Remote units 200*a* and 200*b* input the newly gathered information into their respective remote computers 212, and then transmit the information to crisis command center 100 via their respective transmitters 220. Remote unit 200*a*, equipped with a facsimile machine, facsimiles its suspect description to crisis command center 100. Remote unit 200*b*, equipped with a radio, transmits its witness information to crisis command center 100.

At crisis command center 100, the description received via facsimile and the witness information received via radio transmission are held temporarily in buffer 112 for review. A crisis team member at crisis command center 100 then analyzes the information to determine its relevancy to the kidnapping. In this example, the facsimile machine receiving the facsimile copy, or a radio from which information is audially received, provides buffer 112 before a member of the crisis team enters the information into central computer 114. However, had remote unit 200 transmitted the information via a phone line and a pair of modems, thereby linking remote computer 212 with central computer 114, buffer 112 would have been an electronic temporary storage designed to hold the information for observation by crisis team members to review.

Returning to the example, the central crisis team member may accept the information received via facsimile from remote unit 200*a* because it is relevant to the crisis. On the other hand, the central crisis team member may discard the information transmitted from remote unit 200*b* because the witness appears to be unsure of the facts.

After the suspect description from remote unit 200*a* is deemed relevant, this description is input to central computer 114 into the selected topic file SUSPECTS. Since this description was written on a facsimile copy, it is entered manually via keyboard 120 to central computer 114, which automatically time tags the information with time of entry. Central computer 114 chronologically organizes the information in the selected topic file according to the time tag.

Central computer 114 then automatically updates all relevant files. For example, central computer 114 automatically updates the VIEW LOG file with this new description as follows:

| Entry | Time | Topic |
|---|---|---|
| 1. Kidnapping | 12:00 am | Crisis |
| 2. Victim's name | 1:00 am | Victim |
| 3. Blue van | 2:00 am | Vehicle |
| 4. Buick | 3:00 am | Vehicle |
| 5. 25 Yr. old Male | 4:00 am | Suspect |

Next, central computer 114 transmits the description via transmitter 124 to all remote units 200*a*-200*f* to update their remote topic files with the newly uncovered description of the suspect. Crisis command center 100 may transmit this description over the telephone to remote computer 212, thereby enabling remote computer 212 to input the description to the remote SUSPECTS topic file, organize the information within remote SUSPECTS topic file chronologically, and update automatically all related topic files, without any interaction with the remote crisis team member. As a result, all remote units 200*a*-200*f* now contain in their remote computers 212 the same information regarding the kidnapping, the victim, the vehicles and the suspects as the central computer 114 at crisis command center. Therefore, remote units 200*b*-200*f* can focus their effort toward suspects fitting the description provided by remote unit 200*a*. Without this exchange of information, each remote unit would have had to discover independently the same facts regarding the description of the suspect.

Although the kidnapping crisis situation was described herein for exemplary purposes, the present invention is applicable to all crisis situations including, but not limited to, hijackings, hostage barricades, bomb threats, and extortions. Furthermore, the present invention is equally applicable to crisis situations arising from natural disasters including, but not limited to, hurricanes, earthquakes, tornadoes and floods.

The present invention is advantageous over conventional crisis management systems. Predetermined topic files and automatically time tagging each information entry provide an efficient chronological organization of crisis information. Automatically updating relevant files eliminates redundant recordation and insures up-to-date information in all related crisis topics.

The present invention provides an efficient and effective method of disseminating information. By maintaining up-to-date information in the crisis command center and all remote units, the present invention reduces problems such as redundant searches, misinformed crisis team members, and over allocation of resources.

It is to be understood that the invention is not limited to the disclosed embodiment, but is intended to cover various modifications and equivalent arrangements included within the spirit and scope of the appended claims.

What is claimed is:

1. A crisis management system comprising:

means for receiving crisis information concerning a particular crisis;

crisis information storing means, for storing;

1) a list of most usual crisis situation types, 2) for each of said crisis situation types, a list of topic files each of which represents a type of information associated with said each crisis situation type, and 3) for each topic file, a list of other topic files related to said each topic file, and in which related information should be stored;

processing means, responsive to said information from said receiving means, for:

1) determining a beginning of said particular crisis, and beginning a crisis clock at said beginning of said particular crisis, 2) obtaining a particular crisis situation type associated with said particular crisis;

3) accessing said crisis information storing means using said particular crisis situation type and obtaining a list of topic files associated therewith;

4) attaching automatically a time from said crisis clock to each item of said crisis information;

5) determining a selected topic file to which said each crisis information most closely belongs;

6) accessing said crisis information storing means to obtain said list of said other topic files associated with said selected topic file;

7) storing said each crisis information and its associated time in all of said selected topic file, and said other topic files from said list; and 8) organizing said information in the selected file chronologically with respect to said attached time; and means for exhibiting said information in each said selected file in a predetermined format.

2. A crisis management system according to claim 1, further comprising transmitting means for receiving said information from said processing means and transmitting said information to a remote location.

3. A crisis management system according to claim 2, wherein said receiving means and said transmitting means are a telephone and modem.

4. A crisis management system according to claim 2, wherein said receiving means and said transmitting means are a radio.

5. A crisis management system according to claim 2, wherein said receiving means and said transmitting means are a facsimile machine.

6. A crisis management system according to claim 2, wherein said receiving means and said transmitting means include means for performing satellite communications.

7. A crisis management system according to claim 2, further comprising at least one remote unit comprising:

remote receiving means for receiving said information transmitted from said transmitting means;

remote processing means for: (1) receiving said information; (2) storing said information into a selected remote file based upon a nature of said information; and (3) updating automatically with said information all remote files having predetermined relevance to the selected remote file; and remote transmitting means for transmitting said information to said receiving means.

8. A crisis management system according to claim 7, further comprising means for exhibiting remotely said information in each said file in a predetermined format.

9. A crisis management system according to claim 2, wherein said crisis clock corresponds to a current time in a time zone in which the crisis arose.

10. A crisis management system comprising a central command unit and plurality of remote units located remotely from said central command unit, (a) said central command unit comprising:

(i) central receiving means for receiving crisis information indicative of a particular crisis from said remote units;

(ii) buffer means for holding said crisis information until it is determined whether said information is relevant to the particular crisis;

(iii) crisis information storing means, including:

1) a list of most usual crisis situation types, 2) for each of said crisis situation types, a list of topic files each of which represent a type of information associated with said each crisis situation type, and 3) for each topic file, a list of other topic files related thereto into which related information should be stored;

processing means, responsive to said information from said receiving means, for:

1) determining a beginning of said particular crisis, and beginning a crisis clock at said beginning of said particular crisis, 2) obtaining a particular crisis situation type associated with said particular crisis;

3) accessing said crisis information storing means using said particular crisis situation type and obtaining a list of topic files associated therewith;

4) attaching automatically a time from said crisis clock to each time of said information;

5) determining a selected topic file to which said each crisis information most closely belongs;

6) accessing said crisis information storing means to obtain said list of said other topic files associated with said selected topic file;

7) storing said each crisis information and its associated time in all of said selected topic file, and topic files from said list; and 8) organizing said information in the selected file chronologically with respect to the attached time said information into the selected file;

(iv) central exhibiting means for centrally exhibiting said crisis information organized in a predetermined format; and (v) central transmitting means for transmitting said crisis information to all said remote units; and (b) each said remote unit comprising:

(i) remote receiving means for receiving said information transmitted by said central transmitting means of said central command unit;

(ii) remote processing means for: (1) receiving said information from said remote receiving means; (2) storing said information into a selected remote file based upon a nature of said information; (3) attaching automatically a time to said information; (4) organizing chronologically with respect to said time attached by said remote processing means said information in said selected remote file; and (5) updating automatically with said information all remote files having predetermined relevance to the selected remote file;

(iii) remote exhibiting means for exhibiting remotely said information in a predetermined format; and (iv) remote transmitting means for transmitting said information to said central receiving means of said central command unit;

wherein said central command unit and said remote units automatically maintain updated files via said transmission of information.

11. A crisis management system according to claim 10, wherein said crisis clock corresponds to a current time in a time zone in which the crisis arose.

12. A method for managing crisis situations, comprising the steps of:
receiving crisis information concerning a particular crisis;
storing a list of most usual crisis situation types;
storing, for each of said crisis situation types, a list of topic files, each of which represent a type of information associated with said each crisis situation type;
storing, for each topic file, a list of other topic files related thereto into which related information should be stored;
determining a beginning of said particular crisis, and beginning a crisis cock at said beginning of said particular crisis,
obtaining a particular crisis situation type associated with said particular crisis;
using said particular crisis situation type to obtain a list of topic files associated therewith;
attaching automatically a time from said crisis clock to each item of said crisis information;
determining a selected topic file to which said each crisis information most closely belongs;
obtaining said list of said other topic files associated with said selected topic file;
storing said each crisis information and its associated time in all of said selected topic file, and topic files from said list; and
organizing said information in the selected file chronologically with respect to the attached time.

13. A method according to claim 12, further comprising the step of exhibiting said information.

14. A method according to claim 12, further comprising the step of altering information already existing in said selected file.

15. A method according to claim 12, further comprising the step of transmitting said information to remote locations.

16. A method according to claim 15, further comprising the steps of:
receiving said transmitted information at a remote location;
inputting said information into a selected remote file based upon a nature said information;
organizing chronologically said information in said selected remote file based upon said time attached to said information prior to transmission; and
updating automatically with said information all other remote files having predetermined relevance to said selected remote file.

17. A method according to claim 12, further comprising the steps of:
receiving said transmitted information at a remote location;
selecting automatically a remote file based upon a nature of said information;
inputting automatically said transmitted information into said remote file;
organizing chronologically said information in said remote file based upon said time attached to said information prior to transmission;
updating automatically with said transmitted information all other remote files having predetermined relevance to said remote file; and
remotely exhibiting said information.

18. A method according to claim 17, further comprising the steps of:
inputting at said remote location newly gathered information into said remote file;
attaching automatically a time to said new information;
organizing chronologically said new information in sad remote file based upon said time attached to said new information; and
transmitting said new information to a central location.

* * * * *